(12) United States Patent
Suh et al.

(10) Patent No.: US 12,074,820 B2
(45) Date of Patent: Aug. 27, 2024

(54) PROTOCOL AND FRAME FORMAT FOR COORDINATED BEAMFORMING

(71) Applicant: HUAWEI TECHNOLOGIES CO., LTD., Shenzhen (CN)

(72) Inventors: Jung Hoon Suh, Kanata (CA); Yan Xin, Kanata (CA); Osama Aboul-Magd, Kanata (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 200 days.

(21) Appl. No.: 17/484,709

(22) Filed: Sep. 24, 2021

(65) Prior Publication Data

US 2023/0102611 A1    Mar. 30, 2023

(51) Int. Cl.
*H04L 5/00*      (2006.01)
*H04B 7/024*      (2017.01)
*H04B 7/0456*      (2017.01)
*H04W 24/10*      (2009.01)

(52) U.S. Cl.
CPC ......... *H04L 5/0053* (2013.01); *H04B 7/0456* (2013.01); *H04W 24/10* (2013.01)

(58) Field of Classification Search
CPC ..... H04B 7/0456; H04B 7/024; H04W 24/10; H04L 5/0035
See application file for complete search history.

(56) References Cited

U.S. PATENT DOCUMENTS

| | | | |
|---|---|---|---|
| 2014/0153415 A1* | 6/2014 | Choudhury | H04B 7/024 370/252 |
| 2016/0270105 A1* | 9/2016 | Zhou | H04W 4/70 |
| 2018/0238951 A1* | 8/2018 | Tao | G06F 18/29 |
| 2019/0081664 A1 | 3/2019 | Vermani et al. | |
| 2019/0254007 A1* | 8/2019 | Gupta | H04L 5/0055 |

(Continued)

FOREIGN PATENT DOCUMENTS

| | | | |
|---|---|---|---|
| CN | 109714092 A | 5/2019 | |
| WO | WO-2011115703 A1 * | 9/2011 | H04L 5/0032 |
| WO | 2021008580 A1 | 1/2021 | |

OTHER PUBLICATIONS

3GPP TSG RAN WG1 #149, R1-072016 Title: Performance of Tail-biting Convolution Code (Year: 2007).*

(Continued)

*Primary Examiner* — Faruk Hamza
*Assistant Examiner* — Abusayeed M Haque (57) ABSTRACT

The present disclosure provides methods and apparatus for coordinated beamforming. An aspect of the disclosure provides a method. The method includes sending, by a first access point (AP) of a plurality of collaborating APs, to one or more stations (STAs) associated with the plurality of collaborating APs, a request for channel state information (CSI) associated with the one or more STAs and the first AP. The method further includes receiving a response including the CSI associated with the one or more STAs and the first AP. The method further includes sending, to a second AP of the plurality of collaborating APs, a sounding request indicating the second AP to request, from the one or more STAs, CSI associated with the one or more STAs and the second AP. The method further includes sharing CSI information between the first and the second AP.

15 Claims, 6 Drawing Sheets

(56) References Cited

U.S. PATENT DOCUMENTS

| | | |
|---|---|---|
| 2020/0037275 A1 | 1/2020 | Liu et al. |
| 2020/0336176 A1 | 10/2020 | Seok et al. |
| 2020/0358486 A1 | 11/2020 | Suh et al. |
| 2020/0403680 A1* | 12/2020 | Li .................. H04B 7/0695 |
| 2021/0044333 A1* | 2/2021 | Jiang ................ H04B 7/0619 |
| 2021/0143878 A1 | 5/2021 | Suh et al. |

OTHER PUBLICATIONS

3GPP TSG-RAN WG3 Meeting #85bis, R3-142126 (Year: 2014).*

J. Suh et. al., "Method and Apparatus for Channel State Information Feedback for Joint Transmission", U.S. Appl. No. 62/932,845, filed Nov. 8, 2019.

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Standard 802.11, 2020, 4379 pages.

IEEE Draft Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, Amendment 8: Enhancements for extremely high thoughput (EHT), IEEE P802.11be/D0.2, Dec. 2020, 347 pages.

IEEE Draft Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, Amendment 8: Enhancements for extremely high thoughput (EHT), IEEE P802.11be/D1.2, Sep. 2021, 735 pages.

R1-100331, Nokia Siemens Networks et al., Coordinated Beamforming/Scheduling performance evaluation, 3GPP TSG-RAN WG1 Meeting #59b, Valencia, Spain, Jan. 18-22, 2010, 8 pages.

* cited by examiner

PROTOCOL AND FRAME FORMAT FOR COORDINATED BEAMFORMING

CROSS-REFERENCE TO RELATED APPLICATIONS

This is the first application filed for the present invention.

FIELD OF THE INVENTION

The present invention pertains to the field of communication networks, and in particular to a procedure and frame structure for coordinated beamforming (CoBF).

BACKGROUND

CoBF is likely to be a main feature of the multi access point (M-AP) collaboration topic for the 802.11be Release 2 (R2). There are several issues in introducing the CoBF to the IEEE 802.11, which have yet to be addressed. A first issue is determining how selected user information may be shared among the coordinated APs. Existing protocols do not provide for an adequate procedure for sharing selected user information among the coordinated APs. A second issue is related to computation of the precoder for the participating APs in CoBF. Currently, precoder computation is vendor specific. Vendor specific precoder computation is not adequate for CoBF due to the likely interferences that may result from such computations.

Therefore, there is a need for a procedure and frame structure for CoBF that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

The present disclosure provides methods and apparatus related to coordinated beamforming. A first aspect of the disclosure provides a method. The method includes sending, by a first access point (AP) of a plurality of collaborating APs to one or more stations (STAs) associated with the plurality of collaborating APs, a request for channel state information (CSI) associated with the one or more STAs and the first AP. The method further includes receiving, by the first AP from the one or more STAs, a response including the CSI associated with the one or more STAs and the first AP. The method further includes sending, by the first AP to a second AP of the plurality of collaborating APs, a sounding request indicating the second AP to request, from the one or more STAs, CSI associated with the one or more STAs and the second AP. The method further includes receiving, by the first AP from the second AP, a first AP-AP share message including the CSI associated with the one or more STAs and the second AP. The method further includes sending, by the first AP to the second AP, a second AP-AP share message including the CSI associated with the one or more STAs and the first AP. The method may provide for a medium access control (MAC) protocol sharing information among participating APs in CoBF.

In some embodiments of the first aspect, the second AP-AP share message including a frame including one or more fields indicating one or more of: an identifier of the first AP; an indication that the frame is an AP-AP share frame; one or more STAs associated with the first AP; the CSI associated with the one or more STAs and the first AP; one or more streams per STA of the one or more STAs associated with the first AP; and precoder information associated with the second AP. The method may further provide for a frame format for sharing information among participating APs in CoBF.

In some embodiments of the first aspect, the method further includes computing, by the first AP, a plurality of precoders, wherein each computed precoder: corresponds to a respective AP of the plurality of collaborating APs and is based on CSI information associated with the one or more STAs and the respective AP. The method may further provide for computing precoder information for the participating APs in CoBF.

In some embodiments of the first aspect, the sending the request for CSI associated with the one or more STAs and the first AP includes: sending a null data packet announcement (NDPA) to each one of the one or more STAs. In some embodiments, the sending the request for CSI associated with the one or more STAs and the first AP further includes, shortest interframe spacing (SIFS) time units after sending the NDPA, sending a null data packet (NDP) to each one of the one or more STAs. In some embodiments, the request for CSI associated with the one or more STAs and the first AP further includes, SIFS time units after sending the NDP, sending a beam forming report frame from each one of the one or more STAs In some embodiments of the first aspect, the precoder information indicates a computed precoder of the plurality of precoders. In some embodiments, the precoder information indicates a precoder index indicating a precoder computation method. In some embodiments, the CSI associated with the one or more STAs and the first AP is indicated in a selected user field of the frame. In some embodiments, the identifier of the first AP is indicated in a transmitter address (TA) field of a medium access control (MAC) header of the frame. The method may further provide for sharing of information among collaborating APs that may be necessary for CoBF.

A second aspect of the disclosure provides for another method. The method includes receiving, by a first access point (AP) from a second AP, a first share message including channel state information (CSI) associated with the second AP, wherein the first AP and the second AP are in collaboration. The method further includes sending, by the first AP to the second AP, a second share message including a frame including one or more fields indicating one or more of: an identifier of the first AP; an indication that the frame is an AP-AP share frame; one or more stations (STAs) associated with the first AP; CSI associated with the first AP; one or more streams per STA of the one or more STAs associated with the first AP; and precoder information associated with the second AP. The method may further provide for a frame format for sharing information among participating APs in CoBF.

In some embodiments of the second aspect, the method further includes computing, by the first AP, a precoder associated with the second AP based on the CSI associated with the second AP. In some embodiments, the precoder information associated with the second AP indicates the computed precoder associated with the second AP. In some embodiments, the precoder information associated with the second AP indicates a precoder index indicating a precoder computation method. In some embodiments, the CSI associated with the first AP is indicated in a selected user field of the frame. In some embodiments, the identifier of the first AP is indicated in a transmitter address (TA) field of a medium access control (MAC) header of the frame. The method may further provide for sharing of information among collaborating APs that may be necessary for CoBF.

A third aspect of the disclosure provides for another method. The method includes sending, by a first access point (AP) of a plurality of collaborating APs to one or more stations (STAs) associated with the plurality of collaborating APs, a request for channel state information (CSI) associated with the one or more STAs and the first AP. The method further includes receiving, by the first AP from the one or more STAs, a response including the CSI associated with the one or more STAs and the first AP. The method further includes sending, by the first AP to a second AP of the plurality of collaborating APs, a sounding request indicating the second AP to request, from the one or more STAs, CSI associated with the one or more STAs and the second AP. The method further includes sending, by the first AP to the second AP, a first AP-AP share message including the CSI associated with the one or more STAs and the first AP. The method further includes receiving, by the first AP from the second AP, a second AP-AP share message including the CSI associated with the one or more STAs and the second AP. The method may provide for an alternative MAC protocol sharing information among participating APs in CoBF.

In some embodiments of the third aspect, the method further includes computing, by the first AP, an end time for the plurality of collaborating APs to collect corresponding CSI.

In some embodiments of the third aspect the second AP-AP share message comprises a frame including one or more fields indicating one or more of: an identifier of the second AP; an indication that the frame is an AP-AP share frame; one or more STAs associated with the second AP; the CSI associated with the one or more STAs and the second AP; and precoder information associated with the first AP. The method may further provide for a frame format for sharing information among participating APs in CoBF. The method may further provide for a frame format for sharing information among participating APs in CoBF. The method may further provide for sharing of information among collaborating APs that may be necessary for CoBF.

A fourth aspect of the disclosure provides for another method. The method includes receiving, by a first access point (AP) of a plurality of collaborating APs from a second AP of the plurality of collaborating APs, a sounding request indicating the first AP to request channel state information (CSI) from one or more stations (STAs) associated with the plurality of collaborating APs. The method further includes sending, by the first AP to the one or more STAs, a request for CSI associated with the one or more STAs and the first AP. The method further includes receiving, by the first AP from the one or more STAs, a response comprising the CSI associated with the one or more STAs and the first AP. The method further includes receiving, by the first AP from the second AP, a first AP-AP share message including the CSI associated with the one or more STAs and the second AP. The method further includes sending, by the first AP to the second AP, a second AP-AP share message including the CSI associated with the one or more STAs and the first AP. The method may provide for a MAC protocol sharing information among participating APs in CoBF.

In some embodiments of the fourth aspect, the second AP-AP share message comprises a frame including one or more fields indicating one or more of: an identifier of the first AP; an indication that the frame is an AP-AP share frame; one or more STAs associated with the first AP; the CSI associated with the one or more STAs and the first AP; and precoder information associated with the second AP. The method may further provide for a frame format for sharing information among participating APs in CoBF.

In some embodiments of the fourth aspect, the method further includes computing, by the first AP, a plurality of precoders, wherein each computed precoder: corresponds to a respective AP of the plurality of collaborating APs; and is based on CSI information associated with the one or more STAs and the respective AP. In some embodiments, the precoder information is a computed precoder of the plurality of precoders. The method may further provide for sharing of information among collaborating APs that may be necessary for CoBF.

A fifth aspect of the disclosure provides for another method. The method includes receiving, by a first access point (AP) of a plurality of collaborating APs from a second AP of the plurality of collaborating APs, a sounding request indicating the first AP to request channel state information (CSI) from one or more stations (STAs) associated with the plurality of collaborating APs. The method further includes sending, by the first AP to the one or more STAs, a request for CSI associated with the one or more STAs and the first AP. The method further includes receiving, by the first AP from the one or more STAs, a response comprising the CSI associated with the one or more STAs and the first AP. The method further includes sending, by the first AP to the second AP, a first AP-AP share message including the CSI associated with the one or more STAs and the first AP. The method further includes receiving, by the first AP from the second AP, a first AP-AP share message including the CSI associated with the one or more STAs and the second AP. In some embodiments of the fifth aspect, the second AP-AP share message comprises a frame including one or more fields indicating one or more of: an identifier of the second AP; an indication that the frame is an AP-AP share frame; one or more STAs associated with the second AP; the CSI associated with the one or more STAs and the second AP; and precoder information associated with the first AP. The method may provide for a MAC protocol sharing information among participating APs in CoBF. The method may further provide for a frame format for sharing information among participating APs in CoBF.

A sixth aspect of the disclosure provides for another method. The method includes, by a first access point (AP) of a plurality of collaborating APs, sending to one or more stations (STAs) associated with the plurality of collaborating APs, a request for channel state information (CSI) associated with the one or more STAs and the first AP. The method further includes, receiving, by the first AP from the one or more STAs, a response comprising the CSI associated with the one or more STAs and the first AP. The method further includes, sending, by the first AP to a second AP of the plurality of collaborating APs, a sounding request indicating the second AP to send to the one or more STAs a request for CSI associated with the one or more STAs and the second AP. The method further includes receiving, by the first AP from the second AP, a first AP-AP share message including the CSI associated with the one or more STAs and the second AP. The method further includes, receiving, by the second AP from the first AP, the sounding request. The method further includes sending, by the second AP to the one or more STAs, a request for CSI associated with the one or more STAs and the second AP. The method further includes receiving, by the second AP from the one or more STAs, a response comprising the CSI associated with the one or more STAs and the second AP. The method further includes sending, by the second AP to the first AP, the first AP-AP share message. The method may provide for a MAC protocol sharing information among participating APs in CoBF.

According to a seventh aspect, an apparatus is provided, where the apparatus includes modules configured to perform the methods, according to the different aspects described herein.

According to an eight aspect, an apparatus is provided, where the apparatus includes: a memory, configured to store a program; a processor, configured to execute the program stored in the memory, and when the program stored in the memory is executed, the processor is configured to perform the methods in the different aspects described herein.

According to a ninth aspect, a computer readable medium is provided, where the computer readable medium stores program code executed by a device, and the program code is used to perform the methods the different aspects described herein.

According to a tenth aspect, a chip is provided, where the chip includes a processor and a data interface, and the processor reads, by using the data interface, an instruction stored in a memory, to perform the different aspects described herein.

Other aspects of the disclosure provide for apparatus, and systems configured to implement the methods according to the different aspects disclosed herein. For example, wireless stations and access points can be configured with machine readable memory containing instructions, which when executed by the processors of these devices, configures the device to perform the methods disclosed herein.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Channel State Information (CSI) capabilities were first introduced in 802.11n in the context of multiple-input and multiple-output (MIMO). The CSI training sequence, as may be appreciated by a person skilled in the art, may be designed to measure the channel characteristics between a transmitter and a receiver. CSI may represent how an electromagnetic signal propagates from a transmitter to a receiver and the combined effect of scattering, fading, and power decay with distance of the signal.

CSI may reflect the wireless signal propagation characteristics for a link from a transmitter to a receiver at certain carrier frequencies. CSI measurements may include information when wireless signals transmit through surrounding objects and humans in time, frequency, and spatial domains. CSI measurements may include amplitude variation in CSI in the time domain, phase shifts in CSI in the spatial and frequency domains (e.g., transmit/receive antennas and carrier frequencies), phase shifts in CSI in the time domain.

As mentioned above, coordinated beamforming (CoBF) is likely to be a main feature of the multi access point (M-AP) collaboration topic for the 802.11be R2. There are several Standards issues in introducing the CoBF to the IEEE 802.11. A first Standards issue is that the selected user information needs to be shared among the coordinated APs over the air. A second Standards issue is determining the coordinating AP (which in some context may be referred to a master AP) and the coordinated AP (which in some contexts may be referred to a slave). As may be appreciated by a person skilled in the art the second issue may be resolved during the M-AP set-up phase. A third Standards issue is determining how to set or define the Interference Aligned Precoder among the coordinated APs. Embodiments described herein may address the first and the third Standards issues.

Figure 1:
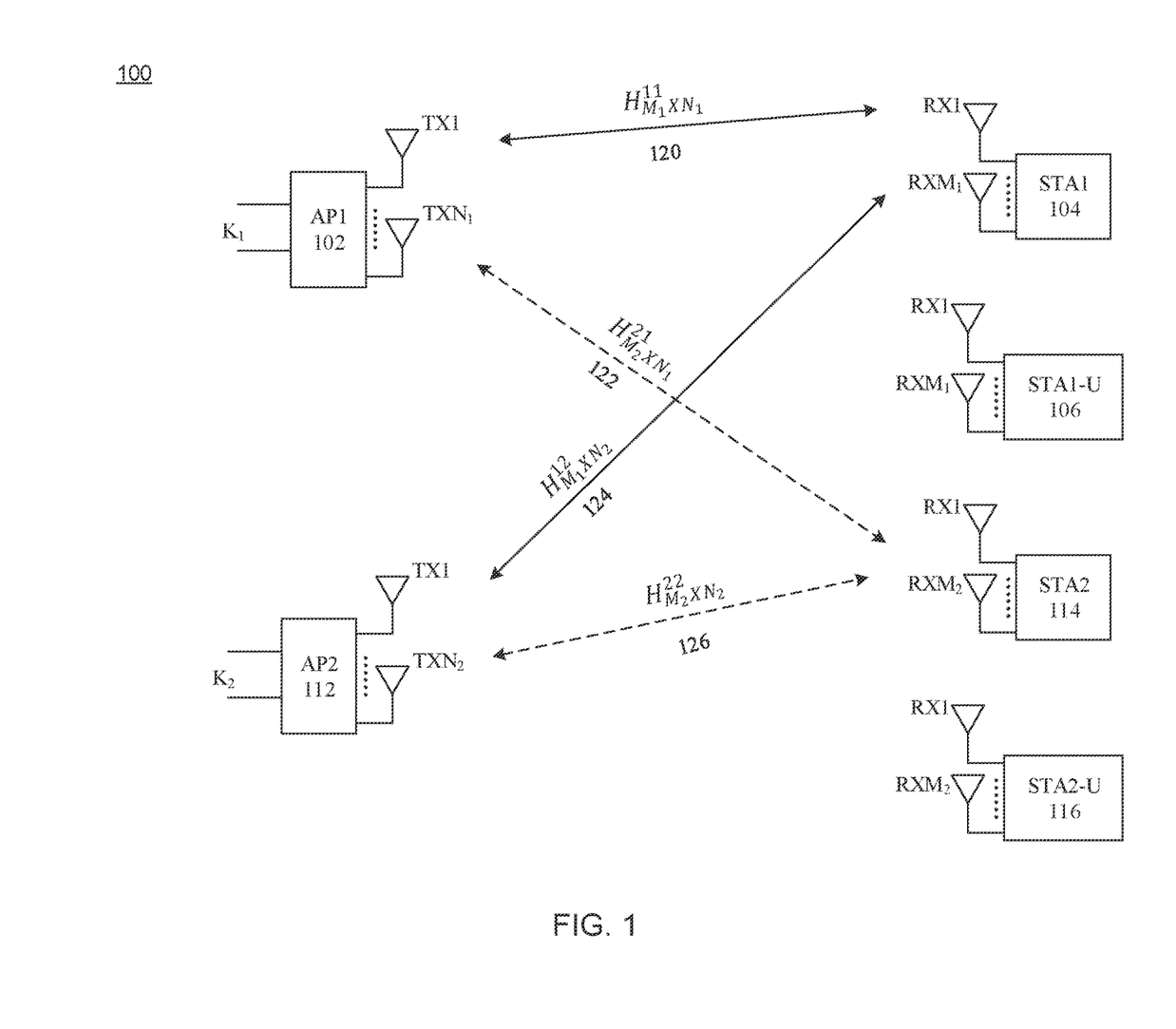
FIG. 1 illustrates a multi-AP collaboration, according to an embodiment of the present disclosure.

FIG. 1 illustrates a multi-AP collaboration, according to an embodiment of the present disclosure. In an embodiment, the multi-AP collaboration system 100 comprises a first AP, AP1 102 and a second AP, AP2 112. AP 1 102 and AP2 112 transmit their frames to one or more associated STAs simultaneously, indicating that AP1 102 and AP2 112 are in collaboration (which may be referred to a M-AP collaboration). While two APs are illustrated, a person skilled in the art may appreciate that the M-AP collaboration system may comprise more than two APs.

Each of the APs may be associated with one or more STAs. For example, AP1 102 is associated with STA1 104 and STA1-U 106. Similarly, AP2 112 is associated with STA 2 114 and STA2-U 116. While multiple STAs may be associated with an AP, the AP may select one or more STAs for scheduling. For example, AP1 102 has selected STA1 104 for scheduling, while STA1-U 106 is unselected. Similarly, AP2 has selected STA2 114 for scheduling, while STA2-U 116 is unselected. Accordingly, channels $H_{M_1 \times N_1}^{11}$ 120, $H_{M_2 \times N_1}^{21}$ 122, $H_{M_1 \times N_2}^{12}$ 124 and $H_{M_2 \times N_2}^{22}$ 126 are formed between the selected STAs, STA1 104 and STA2 114, and APs in collaboration, AP1 102 and AP2 112, for frame transmissions. As illustrated, $H_{M_1 \times N_1}^{11}$ 120 is a channel between STA1 104 and AP1 102. Superscript "11" in $H_{M_1 \times N_1}^{11}$ indicates that the channel is between STA1 104 and AP1 102. Subscript "$M_1 \times N_1$" indicates the size of the H matrix (H indicating a channel), where "$M_1$" indicates the number of receiver (RX) antennas of STA1 104 and "$N_1$" indicates the number of transmitter (TX) antennas of AP1 102. Similarly, $H_{M_2 \times N_1}^{21}$ 122 is a channel between STA2 114 and AP1 102; $H_{M_1 \times N_2}^{12}$ 124 is a channel between STA1 104 and AP2 112; and $H_{M_2 \times N_2}^{22}$ 126 is a channel between STA2 114 and AP2 112.

In the context of beamforming, there can be two schemes for M-AP collaboration. A first scheme is CoBF, which means beamforming is coordinated among the collaborated APs (e.g., AP1 102 and AP2 112). The second scheme is joint transmission, which means, the collaborated APs transmit frames jointly. Joint transmission may indicate that the each of the collaborated APs share data of its selected STA with other APs.

As mentioned herein, each collaborating AP may select one or more STAs among its associated STAs. In the embodiment of FIG. 1, AP1 102 has selected STA1 104 and AP2 112 has selected STA2 114. After the selection of one or more STAs, each collaborating AP is to share the one or more selected STAs information with the other collaborating APs. Embodiments described herein may provide for a protocol for sharing selected STAs among collaborating APs.

Embodiments described herein may provide for computing the interference aligned precoder. Referring to FIG. 1, as may be appreciated by a person skilled in the art, $H_{M_2 \times N_1}^{21}$ 122 and $H_{M_1 \times N_2}^{12}$ 124 are interferences, whereas $H_{M_1 \times N_1}^{11}$ 120 and $H_{M_2 \times N_2}^{12}$ 126 are used for the actual information data. Accordingly, it is desirable to minimize $H_{M_2 \times N_1}^{21}$ 122 and $H_{M_1 \times N_2}^{12}$ 124 as much as possible to reduce the interferences. The interferences, therefore, needs to be managed accordingly. As part of managing the interference, one or more interference aligned precoder may be computed and shared among the collaborating APs.

As may be appreciated by a person skilled in the art, during the sounding process 260 (see FIG. 2), collaborating APs, e.g., AP1 102 and AP2 112, may collect CSI information from all the participating STAs. When STA1 104 sends feedback information associated with the channels $H_{M_1 \times N_1}^{11}$ 120 to AP1 102, AP2 112 may overhear the feedback information. Similarly, when STA1 104 sends feedback information to AP2 112 associated with the channel $H_{M_1 \times N_2}^{12}$ 124 to AP2 112, AP1 102 may overhear the feedback information.

Computing precoder, based on the collected CSI information, has not yet been standardized, and each vendor computes its own precoder (because when beamforming packet is transmitted by an AP to the STA, the STA does not need to know what type of beamforming is applied). However, in the case of collaborating APs, having each AP computing its own precoder independently is likely to lead to interference, and therefore, transmitted packets by the APs may not reach their destination (e.g., one or more recipient STAs). Accordingly, the precoder computation for the collaborating APs needs to be managed to minimize any potential interferences. Managing the precoder computation may involve sharing, over the air, precoder information among the collaborating APs, before transmitting one or more beamforming packets.

Embodiments described herein may provide for protocols and frame formats associated with CoBF scheme. As may be appreciated by a person skilled in the art, CoBF limits the information sharing among the coordinated APs but such information sharing may not be totally avoided. Embodiments described herein may define what information to share among the coordinated APs, and thus, may provide the necessary protocols and their frame formats based on the defined information.

Figure 2:
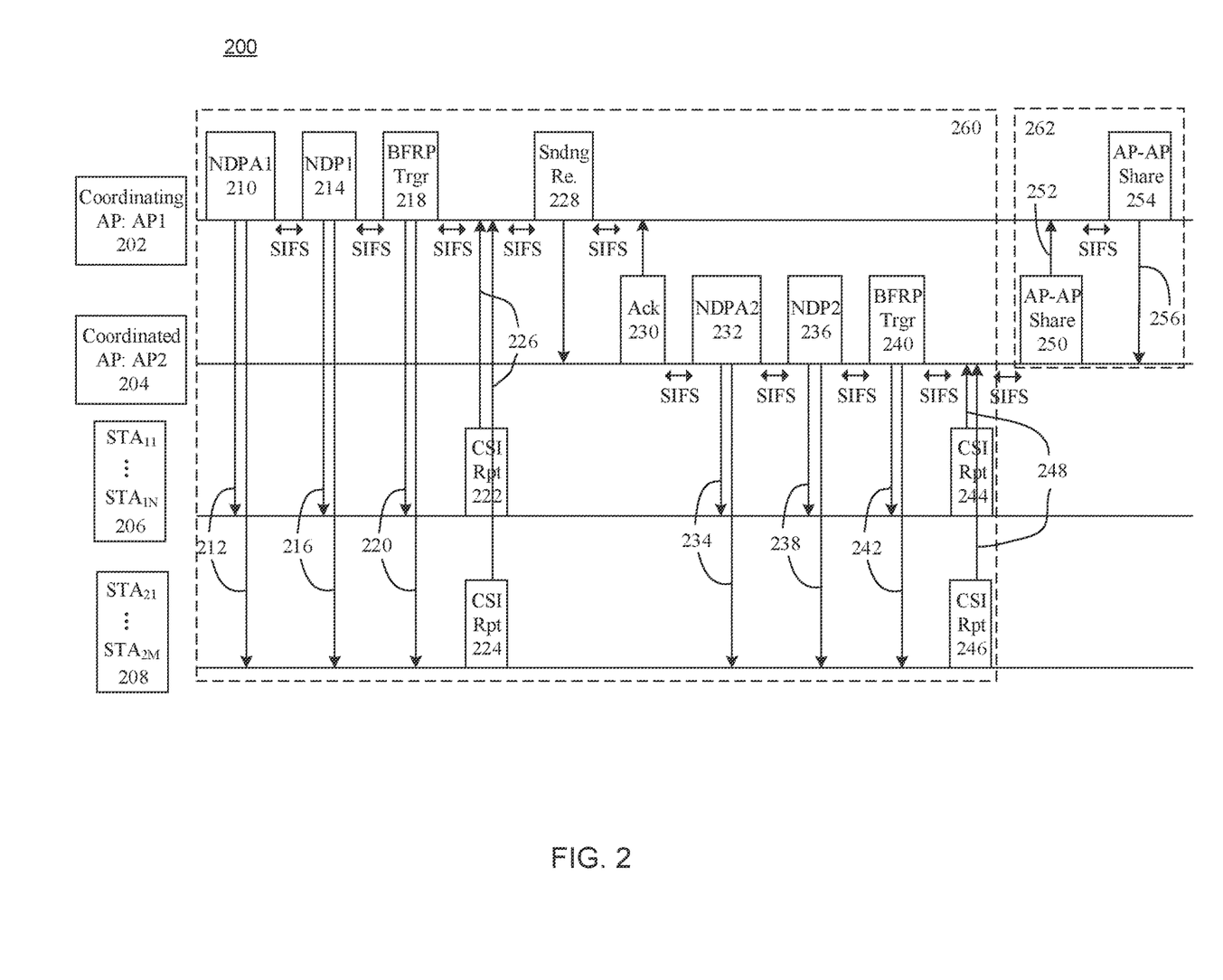
FIG. 2 illustrates a protocol for AP-to-AP sharing in CoBF, according to an embodiment of the present disclosure.

FIG. 2 illustrates a protocol for AP-to-AP sharing in CoBF, according to an embodiment of the present disclosure. The protocol 200 is based on serial sounding in which the NDPA and NDP are serially transmitted by each of the collaborating APs. In protocol 200, there are two APs (AP1 102 and AP2 112) in collaboration. The collaborating APs comprise a coordinating AP, e.g., AP1 102, and one or more coordinated AP, e.g., AP2 112.

As may be appreciated by a person skilled in the art, a sounding packet comprises one or more of NDPA, NDP and beam forming report (BFRP) trigger frames. The BFRP trigger frame is used when there are more than one participating STAs and for receiving, simultaneously, CSI reports from each of the more than participating STAs.

In an embodiment, each collaborating AP sends a sounding packet serially. For example, the coordinating AP, AP1 202, sends 212, simultaneously, an NDPA1 210 to each one or more of participating STAs, e.g., $STA_{11}$ to $STA_{1N}$ 206, and $STA_{21}$ to $STA_{2M}$ 208. $STA_{11}$ to $STA_{1N}$ 206 refer to one or more STAs that are associated with AP1 202, similarly, $STA_{21}$ to $STA_{2M}$ 208 refer to one or more STAS that are associated with AP2 204.

Shortest interframe spacing (SIFS) time units after sending the NDPA1 210, the coordinating AP, AP1 202, sends 216, simultaneously, an NDP1 214 to each one or more of participating STAs, e.g., $STA_{11}$ to $STA_{1N}$ 206, and $STA_{21}$ to $STA_{2M}$ 208.

Each one of the one or more of the participating STAs, e.g., $STA_{11}$ to $STA_{1N}$ 206, and $STA_{21}$ to $STA_{2M}$ 208, may compute its CSI between the STA and AP1 202. For example, $STA_{11}$ may compute its CSI between $STA_{11}$ and AP1 202, and $STA_{1N}$ may compute its CSI between $STA_{1N}$ and AP1 202. Similarly, $STA_{21}$ may compute its CSI between $STA_{21}$ and AP1 202, and $STA_{2N}$ may compute its CSI between $STA_{2N}$ and AP1 202.

In embodiments in which more one STA are participating in the protocol 200, SIFS time units after sending the NDP1 214, the coordinating AP, AP1 202, sends 220, simultaneously, a BFRP trigger frame 218 to participating STAs, e.g., $STA_{11}$ to $STA_{1N}$ 206, and $STA_{21}$ to $STA_{2M}$ 208.

SIFS time units after receiving the BFRP trigger frame 218, each of the one or more of the participating STAs, e.g., $STA_{11}$ to $STA_{1N}$ 206, and $STA_{21}$ to $STA_{2M}$ 208, may then send 226 its computed CSI report to AP1 202. The participating STAs, e.g., $STA_{11}$ to $STA_{1N}$ 206, and $STA_{21}$ to $STA_{2M}$ 208, simultaneously, send 226, their CSI reports 222 and 224 to AP1 202.

SIFS time units after receiving the one or more CSI reports 222 and 224 from the participating STAs, the coordinating AP, e.g., AP1 202, may send a sounding request frame 228 to the next collaborating AP (e.g., AP2 204) according to the sequence of the sounding process 260.

SIFS time units after receiving the sounding request frame 228, the coordinated AP, AP2 204, may send an acknowledgement frame 230 to the coordinating AP, AP1 202. SIFS time units thereafter, the coordinated AP, AP2 204, sends 234, simultaneously, an NDPA2 232 to each one or more of participating STAs, e.g., $STA_{11}$ to $STA_{1N}$ 206, and $STA_{21}$ to $STA_{2M}$ 208. SIFS time units after sending the NDPA2 232, the coordinated AP, AP2 204, sends 238, simultaneously, an NDP2 236 to each one or more of participating STAs, e.g., $STA_{11}$ to $STA_{1N}$ 206, and $STA_{21}$ to $STA_{2M}$ 208.

Each one of the one or more of the participating STAs, e.g., $STA_{11}$ to $STA_{1N}$ 206, and $STA_{21}$ to $STA_{2M}$ 208, may compute its CSI between the STA and AP2 204. For example, $STA_{11}$ may compute its CSI between $STA_{11}$ and AP2 204, and $STA_{1N}$ may compute its CSI between $STA_{1N}$ and AP1 202. Similarly, $STA_{21}$ may compute its CSI between $STA_{21}$ and AP2 204, and $STA_{2N}$ may compute its CSI between $STA_{2N}$ and AP2 204.

In embodiments in which more than one STA are participating in the protocol 200, SIFS time units after sending the NDP2 236, the coordinated AP, AP2 204, sends 242, simultaneously, a BFRP trigger frame 240 to participating STAs, e.g., $STA_{11}$ to $STA_{1N}$ 206, and $STA_{21}$ to $STA_{2M}$ 208. As may be appreciated by a person skilled in the art, in embodiments in which only one STA is participating, then, the BFRP trigger frame is not needed to be sent.

SIFS time units after receiving the BFRP trigger frame 240, each of the one or more of the participating STAs, e.g., $STA_{11}$ to $STA_{1N}$ 206, and $STA_{21}$ to $STA_{2M}$ 208, may then send 248 its computed CSI report to AP2 204. The participating STAs, e.g., $STA_{11}$ to $STA_{1N}$ 206, and $STA_{21}$ to $STA_{2M}$ 208, simultaneously, send 248, their CSI reports 244 and 246 to AP2 204.

Each of the collaborating APs (including the one or more coordinated AP, e.g., AP2 204 and the coordinating AP, e.g., AP1 202) may take multiple BFRP Trigger phases depending on the number of STAs participating in the sounding procedure. For example, in case that there are too many associated STAs for each participating AP to poll the CSI report in one-time BFRP Trigger Frame transmission, it may be necessary, for each participating AP to poll the CSI report multiple times with the multiple BFRP TF transmissions.

Although, FIG. 2 illustrates 2 collaborating APs (a coordinating AP, AP1 202 and a coordinated AP, AP2 204) a person skilled in the art may appreciate that there may be more than two collaborating APs. In the case of multiple coordinated APs (e.g., AP2 204 and AP3 (not shown)), SIFS time units after AP2 204 receives CSI Reports 244 and 246 from the participating STAs, AP2 204 transmits a sounding request frame to the next coordinated AP, e.g., AP3. AP3 may send an Ack to AP2 204 (SIFS time units after receiving the sounding request frame). SIFS units time thereafter, AP3 may then, simultaneously, send an NDPA to each one or more of the participating STAs, e.g., $STA_{11}$ to $STA_{1N}$ 206, and $STA_{21}$ to $STA_{2M}$ 208. SIFS units time thereafter, AP3 may, simultaneously, send an NDP to each one or more of the participating STAs, e.g., $STA_{11}$ to $STA_{1N}$ 206, and $STA_{21}$ to $STA_{2M}$ 208. Each one of the one or more of the participating STAs, e.g., $STA_{11}$ to $STA_{1N}$ 206, and $STA_{21}$ to $STA_{2M}$ 208, may compute its CSI between the STA and AP3. SIFS units time after sending NDP, AP3 may then, simultaneously, send a BFRP trigger frame, to each one or more of the participating STAs. SIFS time units after receiving the BFRP trigger frame, each of the one or more of the participating STAs, e.g., $STA_{11}$ to $STA_{1N}$ 206, and $STA_{21}$ to $STA_{2M}$ 208, may then send, simultaneously, its computed CSI report to AP3.

When the last coordinated AP (sequence of the serial sounding can be set during the set-up phase) ends the sounding process 260 (CSI Report action frames are collected by the last AP), the AP-AP Share frame needs to be transmitted, that is, the AP-AP Share frame implies the end of the serial sounding process 260 as well.

The sequence of the AP-AP Share frame transmission may be the reverse order from the sounding sequence. In FIG. 2, the sounding sequence begins with the coordinating AP, AP1 202 and then the coordinated AP, AP2 204. Accordingly, the AP-AP share frame transmission process 262 begins with the coordinated AP2 204 and then the coordinating AP, AP1 202. In the illustrated embodiment of FIG. 2, SIFS time units after receiving the CSI reports 244 and 246, the coordinated AP2 204 sends 252 an AP-to-AP share frame 250 to the collaborating APs, e.g., coordinating AP1 202. SIFS units after receiving the AP-AP share frame 250, the coordinating AP1 202 sends 256 an AP-to-AP share frame 254 to the collaborating APs, e.g., coordinated AP2 204.

In the case of multiple coordinated APs (e.g., AP2 204 and AP3 (not shown)), the sequence of the AP-AP Share frame transmission may be as follows: AP3, AP2 204 and AP1 202. Accordingly, SIFS time units after receiving CSI reports from one or more participating STAs, AP3 may send an AP-AP share frame to the last collaborating AP (e.g., AP1 202) according to the sequence of the AP-AP share frame transmission process. SIFS time units thereafter, AP2 204 may send an AP-AP share frame to the last collaborating AP (e.g., AP1 202) according to the sequence of the AP-AP share frame transmission process. SIFS time units after collecting all the AP-AP share frames from the coordinated APs (AP2 204 and AP 3), the coordinating AP1 202 may then send an AP-AP share frame targeted to all the coordinated APs (in this case to AP2 204 and AP3).

The AP-AP Share frame transmission process 262 is finished when the frame (e.g., frame 254) from the last collaborating AP (in this embodiment is coordinating AP, AP1 202) according to the sequence of the AP-AP share frame transmission process 262, is received by all the participating APs. The frame AP-AP share frame 254 may include the user selection information from the coordinating AP as further described herein.

As mentioned herein, the collaborating AP and the one or more coordinated APs (including the sequence of the collaborating AP for serially sending the sounding packet frames) is determined at the setup phase.

Figure 3:
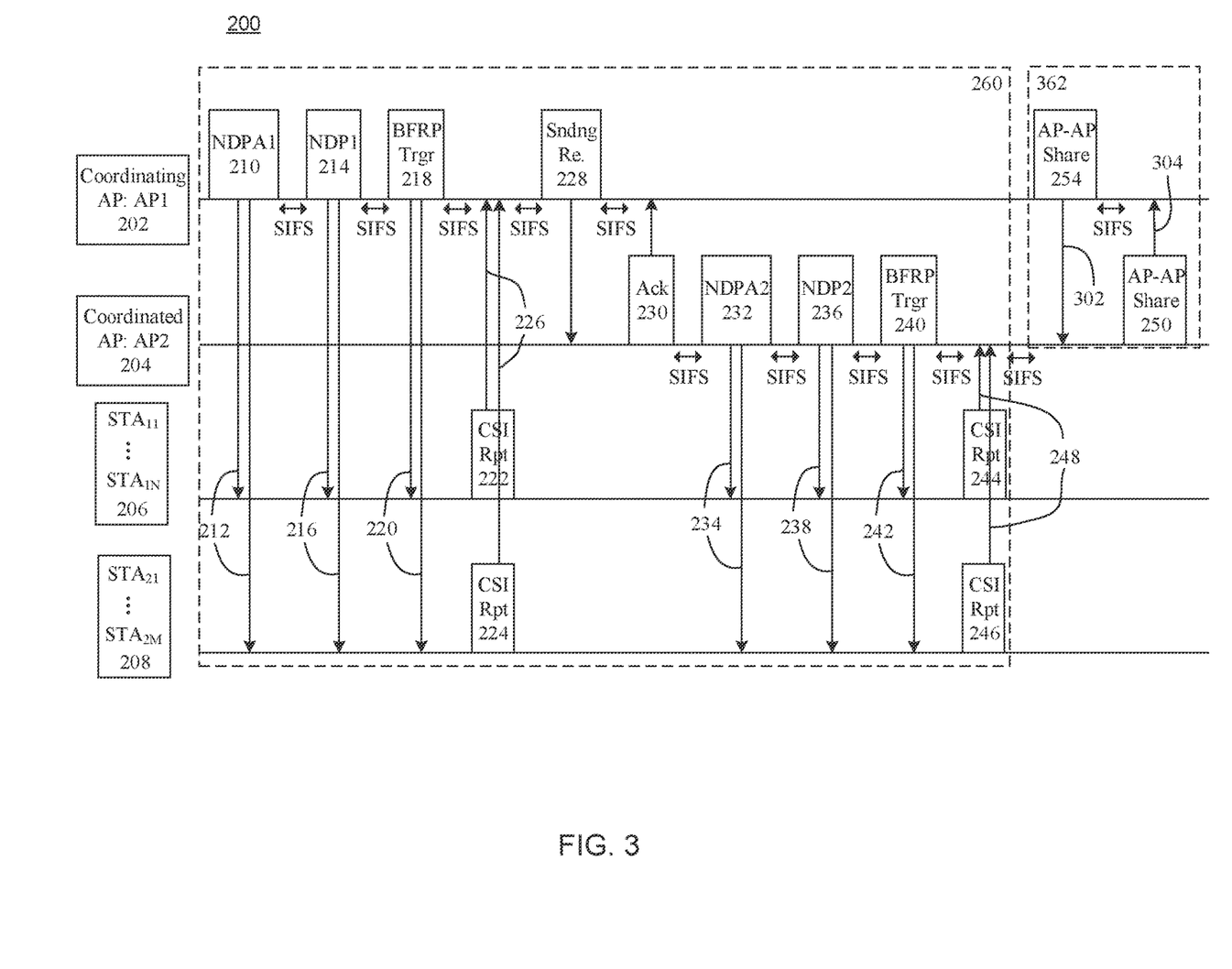
FIG. 3 illustrates an alternative protocol for AP-to-AP sharing in CoBF, according to an embodiment of the present disclosure.

FIG. 3 illustrates an alternative protocol for AP-to-AP sharing in CoBF, according to an embodiment of the present disclosure. In FIG. 3 the sounding sequence process in FIG. 3 is similar to the sounding sequence process 260 in FIG. 2. However, the AP-AP share frame transmission process 362 is in the reverse order of the AP-AP share frame transmission process 262. Accordingly, the AP-AP share frame transmission process 362 is in the same order as the sounding sequence process 260, e.g., AP1 begins the process 362 and AP2 ends the process 362.

According to an embodiment, the coordinating AP, AP1 202 configures the ending time of the sounding process 260 by the last coordinated AP (e.g., AP2 204 in the FIG. 3). The coordinating AP, AP1 202, may compute the ending time of the sounding process 260 based on one or more of: the collaborating APs, the SIFS time units, and the participating STAs. SIFS time units after the last coordinated AP, in this embodiment AP2 204, receives CSI reports 244 and 246 from the participating STAs, the coordinating AP, AP1 202 transmits 302 the AP-AP Share frame 254 to the last collaborating AP (in this embodiment AP2 204) according to the sequence of the AP-AP share frame transmission process 362. SIFS time units after receiving the AP-AP share frame 254, the coordinated AP, AP2 204 sends 304 an AP-AP share frame 250 to the collaborating APs (e.g., AP1 202).

In the case of multiple coordinated APs (e.g., AP2 204 and AP3 (not shown)), the sequence of the AP-AP Share frame transmission may be as follows: AP1 202, AP2 204 and AP3. According to an embodiment, the AP-AP share frame transmission process may be as follows. AP1 202 configures the ending time of the sounding process 260 by the last coordinated AP (e.g., AP3). SIFS time units after the last coordinated AP, e.g., AP3, receives CSI reports from the participating STAs, the coordinating AP, AP1 202 transmits an AP-AP Share frame to the last collaborating AP (e.g., AP3) according to the sequence of the AP-AP share frame transmission process. SIFS time units after receiving the AP-AP share frame, the coordinated AP, AP2 204 sends an AP-AP share frame to the last collaborating AP (e.g., AP3) according to the sequence of the AP-AP share frame transmission process. SIFS time units after collecting all the AP-AP share frames from the participating APs (in this case AP1 202 and AP2 204), the last AP (AP3), according to the sequence of the AP-AP share frame transmission process may then send an AP-AP share frame targeted to all the participating APs (in this case to AP1 202 and AP2 204).

The AP-AP Share frame transmission process is finished when the frame from the last collaborating AP according to the sequence of the AP-AP share frame transmission process, is received by all the participating APs. The last AP-AP share frame may include the user selection information from the coordinating AP as further described herein.

Embodiments described in reference to FIG. 2 and FIG. 3 may provide a medium access control (MAC) protocol for participating APs in CoBF to share the necessary information among each other.

Figure 4:
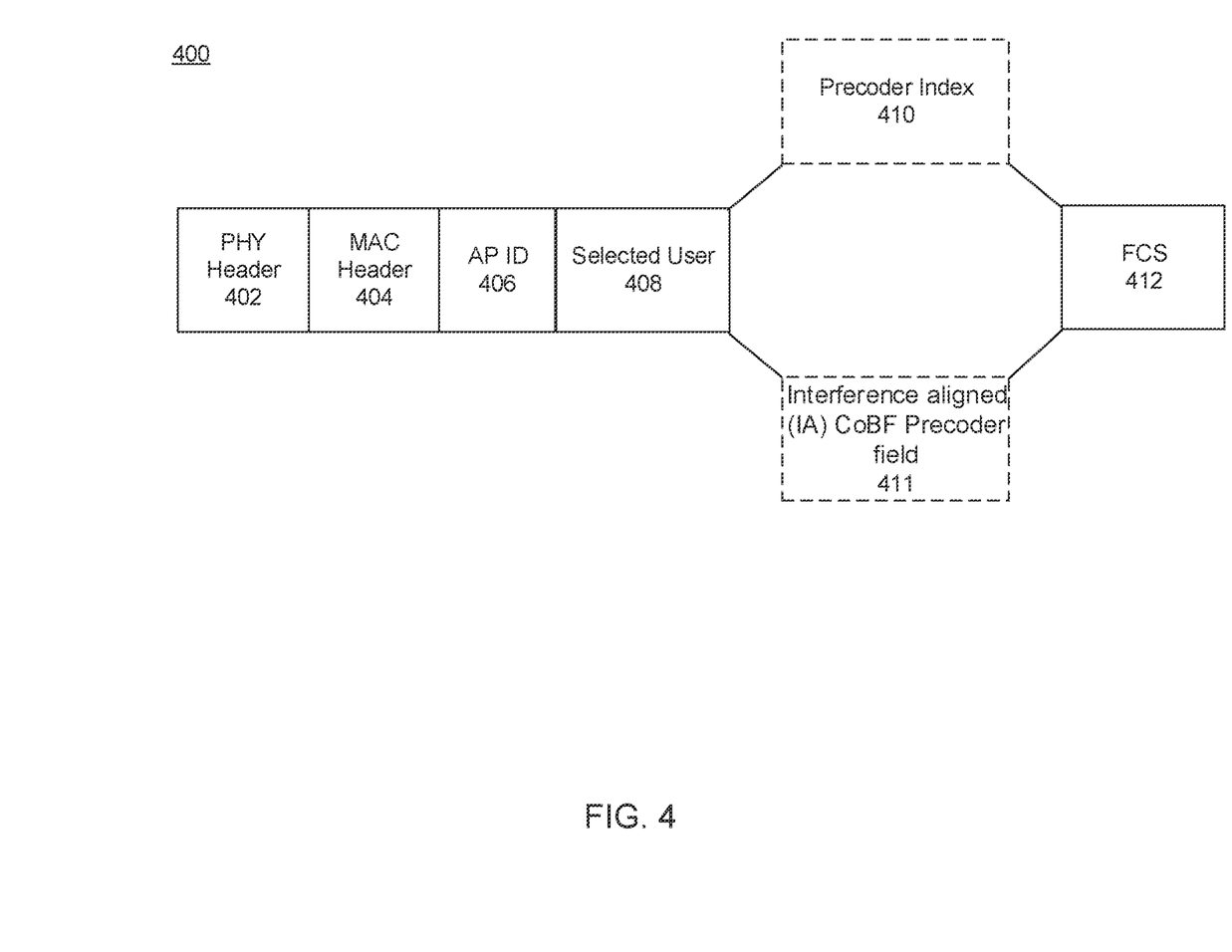
FIG. 4 illustrates a frame format for the AP-AP share frame, according to an embodiment of the present disclosure.

FIG. 4 illustrates a frame format for the AP-AP share frame, according to an embodiment of the present disclosure.

The frame format 400 may be the frame format for the AP-AP share frames of FIG. 2 and FIG. 3 (e.g., AP-AP share frame 250 and 254). The frame format may comprise one or more of a PHY header field 402, a MAC header field 404, an AP identifier (ID) field 406 indicating an identified of the sending AP, a selected user field 408, a precoder index field 410 and a frame check sequence (FCS) field 412.

In an embodiment, the PHY header 402 and the MAC header 404 may share the same format as those of an NDPA frame. The MAC header 404 may indicate that the frame is an AP-AP share frame. The MAC header 404 may include a sub-frame type for indicating that the frame is an AP-AP share frame. In another embodiment, the AP-AP share frame may be indicated through an NDPA Variant frame which can be given in a future design.

In another embodiment, the AP ID field may not be present, in which the AP ID information may be indicated in the MAC Header field 404 via the transmitter address (TA) field (within the MAC header filed). In other embodiments, the AP ID information may be indicated via the AP ID field 406.

The selected user field 408 may indicate a list of selected users (one or more selected STAs) of the participating AP indicated in the AP ID field 406. As discussed in reference to FIG. 1, each of the collaborating APs may select one or more STAs from their associated STAs. The selected STAs are then shared among the collaborating APs via the AP-AP share frame transmission process, according to embodiments described in reference to FIG. 2 and FIG. 3.

The selected user field 408 may further indicate the number of streams per selected user. The selected user field 408 may further indicate a user ID (which may be a MAC address or an associated ID (AID)). The selected user field 408 may further indicate the bandwidth (BW) and Modulation and Coding System (MCS), and other relevant information.

The CSI information between the corresponding AP and each selected STA may be included in the selected user field 408 as well. When the precoder computation is not standardized, that is, implementation-specific, the AP-AP share frame may need to include an interference aligned (IA) CoBF Precoder field 411. Accordingly, the precoder index field 410 may need to be replaced by the IA CoBF precoder field 411, when the precoder computation is not standardized.

In embodiments in which the AP-AP share frame includes an IA CoBF precoder field 411, the IA CoBF Precoder field may be indicated by the last collaborating AP in the AP-AP share transmission process, e.g., 262 and 362. For example, in embodiments which follow FIG. 2, the IA CoBF Precoder field 411 may be indicated by the coordinating AP, AP1 202, via, for example, the AP-AP share frame 254; and in embodiments which follow FIG. 3, the IA CoBF Precoder field 411 may be indicated by the coordinated AP, AP2 204, via, for example, the AP-AP share frame 250.

The selected users may be determined among the associated STAs by the corresponding participating AP. For example, the selected users for the coordinating AP, e.g., AP1 202, are determined or selected, by the coordinating AP, among the associated STAs of the coordinating AP, and similarly, the selected users for a coordinated AP, e.g., AP2 204, are determined or selected, by the coordinated AP, among the associated STAs of the coordinated AP. In embodiments which follow FIG. 2, when the AP ID field 406 indicates the coordinating AP (e.g., AP1 202), the AP-AP share transmission procedure 262 may then end (for example, when the AP-AP share frame 252 indicates the coordinating AP ID in the AP ID field). In embodiments of FIG. 2, the coordinating AP, AP1 202, may further indicate a precoder index, in the precoder index field 410, in the case the Precoders are standardized for the CoBF.

As discussed herein, in the case of collaborating APs, it is desirable to manage interference that may be present. Managing the interference may involve computing a precoder index. The computation of the precoder index may be standardized. The precoder index field 410 may indicate the method for computing the precoder index.

As may be appreciated by a person skilled in the art, the CSI information (e.g., CSI report frames 222, 224, 244, 246) received during the sounding sequence process 260 may be needed for precoder computations. As such, during the AP-AP share transmission process 262 and 363, the CSI information is shared among the collaborating APs. The CSI information may be indicated in selected user field 408.

In some embodiments, the precoder for all collaborating APs may be computed by the last AP in the AP-AP sharing transmission process 262 and 363 and share among the collaborating APs. For example, in embodiments of FIG. 2, the last AP in the AP-AP sharing transmission process 262 is the coordinating AP, AP1 202, which may compute the precoder for all collaborating APs and share the computed precoder to the corresponding collaborating APs. And similarly, in embodiments of FIG. 3, the last AP in the AP-AP sharing transmission process 362 is the coordinated AP, AP2 204, which may compute the precoder for all the collaborating APs, and share the computed precoder with the corresponding collaborating APs.

Figure 5:
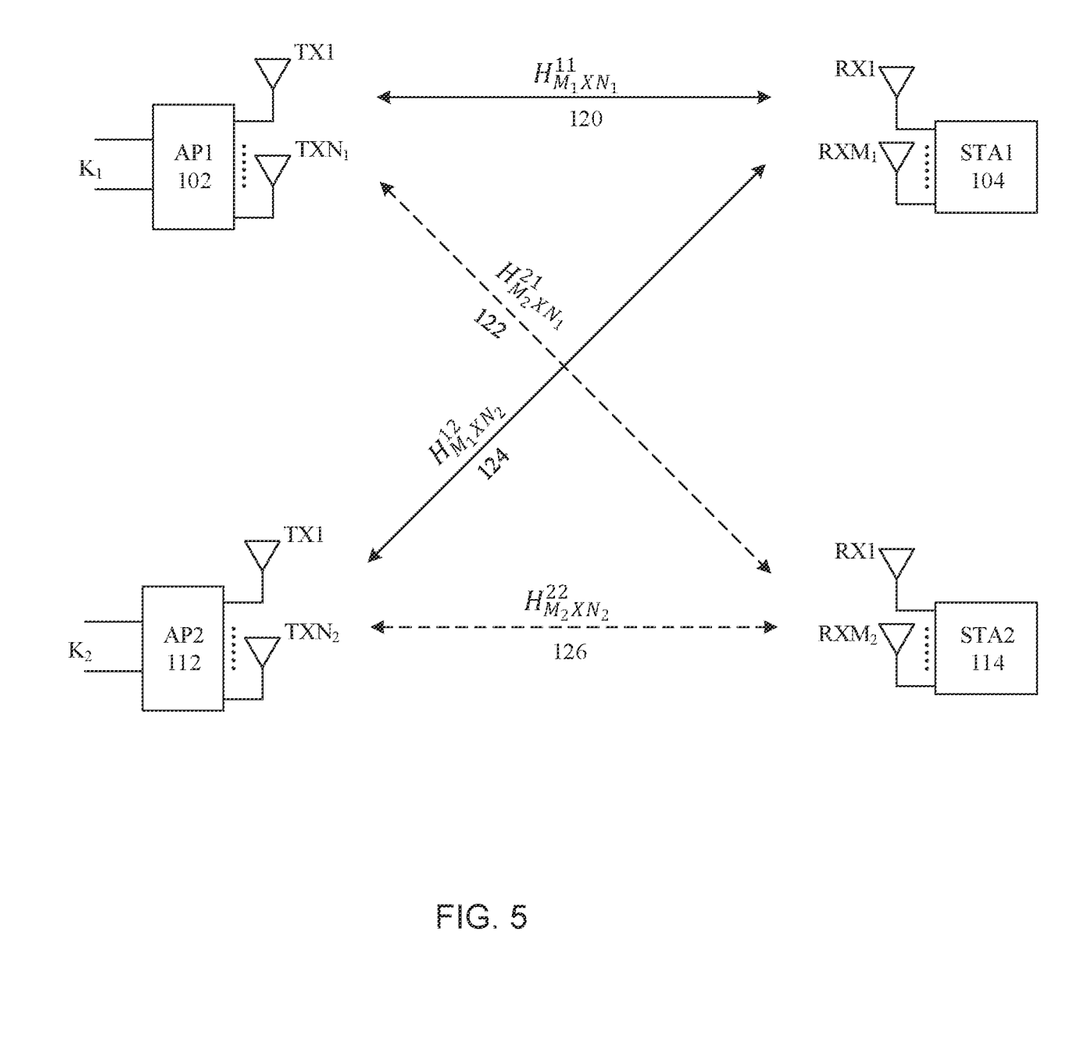
FIG. 5 illustrates a 2-AP CoBF with one selected stations (STAs) in each participating AP, according to an embodiment of the present disclosure.

FIG. 5 illustrates a 2-AP CoBF with one selected STA in each participating AP, according to an embodiment of the present disclosure. FIG. 5 is similar to FIG. 1 and illustrates the collaborating APs and the selected STAs. The collaborated APs perform simultaneous coordinated beamforming (BF) transmissions. As discussed herein, it is desirable to remove the $H_{M_2 \times N_1}^{21}$ 122 and $H_{M_1 \times N_2}^{12}$ 124 channels to minimize or cancel the resulting interferences among the collaborated APs. To do so, the interference needs to managed.

In an embodiment, managing the interference may involve applying zero forcing beamforming (ZF-BF). In ZF-BF, the channels at each collaborating AP may be aggregated and reconstructed. For example, at AP1 102, the channels comprise $H_{M_1 \times N_1}^{11}$ 120 and $H_{M_2 \times N_1}^{21}$ 122. Accordingly, the aggregated channel at AP1 may be given as $$\begin{bmatrix} H_{K_1 \times N_1}^{11} \\ H_{K_2 \times N_1}^{21} \end{bmatrix}$$

and denoted as C1. Similarly, the channels at AP2 112 comprise $H_{M_1 \times N_2}^{12}$ 124 and $H_{M_2 \times N_2}^{22}$ 126. Accordingly, the aggregated channel at AP2 112 may be given as $$\begin{bmatrix} H_{K_1 \times N_2}^{12} \\ H_{K_2 \times N_2}^{22} \end{bmatrix}$$

and denoted as C2.

The ZF-BF based IA precoder at AP1 202 may be obtained by taking the pseudo-inverse of the C1 matrix, and then taking the first K1 columns. The ZF-BF based IA precoder at AP2 112 may be obtained by taking the Pseudo-Inverse of the C2 matrix, and then taking the last K2 columns. The K1 is the rank of the transmission by the AP1, and the K2 is the rank of the transmission by the AP2.

Once the AP-to-AP share process 262 or 362 is completed, all the participating APs perceive the selected STAs (including the number of streams to be scheduled of each STA) to be scheduled for the CoBF. As mentioned, each participating AP may compute the aggregated channel based on the channels formed between the participating AP and the selected STAs, and then takes the Pseudo-Inverse of the aggregated channel. In case of 2-AP coordination, the coordinating AP may take the first $K_1$ columns of the aggregated channel for the Precoder, where $K_1$ represents the size of the transmission rank of the coordinating AP. The coordinated AP may take the last $K_2$ columns of the aggregated channel for the Precoder, where $K_2$ represents the size of the transmission rank of the coordinated AP.

In some embodiments, the last participating AP in the AP-AP share process may compute the precoder for the all the collaborating APs according to ZF-BF and share the computed precoders with their corresponding APs through the AP-AP share frame. For example, in embodiments of FIG. 2, the coordinating AP1 202 may compute its ZF-BF IA precoder and those of the coordinated AP, e.g., AP2 204, and share the computed precoders with their corresponding APs via AP-AP share frame 254. Similarly in embodiments of FIG. 3, the coordinated AP2 204 may compute its ZF-BF IA precoder and those of the coordinated AP (in the case of multiple coordinated APs) and coordinating AP, e.g., AP1 202, and share the computed precoders with their corresponding APs via AP-AP share frame 250.

As described herein, all the collaborating APs share their CSI information via the sounding sequence process 260. Accordingly, the AP responsible (e.g., AP1 202 in FIGS. 2 and AP2 in FIG. 3) for computing precoders for the all the collaborating APs has knowledge of CSI information received at each collaborating AP, therefore capable of computing the precoders. After computing the precoders, the responsible AP may send an AP-AP share frame to the collaborating APs, included in the AP-AP share frame, indicated via the IA CoBF precoder field 411, the computed precoders.

After receiving the computed the precoders, via the AP-AP share frame, the receiving APs (e.g., AP2 204 in FIGS. 2 and AP1 202 in FIG. 3) and the responsible AP may in coordination, using the computed precoders, transmit CoBF packets, simultaneously.

In some embodiments, the transmission or transmitter (TX) power may need to be kept constant under a certain level regardless of the number of TX chains, for example, according to the federal Communications Commission (FCC) regulations. As such the precoder may need to be normalized according to, for example, MIMO configuration.

In an embodiment, the precoder at AP1 may be denoted as P1 and the precoder at AP2 may be denoted P2, then, the new normalized precoder may be written as $$\frac{P1}{\|P1\|_E} \text{ and } \frac{P2}{\|P2\|_E},$$

for AP1 and AP2, respectively.

The "$\|P1\|_E$" may represent the Euclidean norm wherein the magnitude of each P matrix element is squared and summed over all the elements, and thereafter, a square root operation is applied. Accordingly, the Euclidean norm is obtained with the square-root of the sum of the magnitude of all the matrix elements. In some embodiments, the TX power normalization for each Precoder of a participating AP may be performed separately. Accordingly, each participating AP may perform its own TX power normalization.

Precoder information may be different from one subcarrier to another, in one or more participating STAs. It is desirable for the phase precoder information of one subcarrier to another to be continuous. However, since not all subcarriers of the one or more STAs may have a reference signal for channel estimation, then the one or more STAs may rely on interpolation or smoothing for channel estimation.

When a beam-forming (BF) is applied to a frame, the phase information (of the precoder between subcarriers) may become discontinuous between the tones which may lead to difficulty in estimating, via interpolation, the channel. Accordingly, in some embodiments, a Phase Continuity process may be applied during the beam-forming in order to avoid the phase discontinuity problem. In some embodiments, the channel estimation, during the sounding process, for measuring the CSI information may be done through the 802.11 long training field (LTF) based Reference Signal. In such embodiments, the CSI information may be obtained at every number of group of tones (Ng) tones and at every tone at last.

In an embodiment, $P_0, P_1, P_2, \ldots$ may represent a column vector of a pre-coding matrix per tone 0, 1, 2, etc., based on the CSI information during the sounding process. As such, the continuous phase based pre-coding column vector of a precoding matrix may be $$P_0, P_1 e^{j\varphi_1}, P_2 e^{j\varphi_2},$$

where $\varphi_1 = -\text{phase}(P_0^H P_1)$, $\varphi_2 = -\text{phase}(T_1^H P_2)$, and $T_1$ may represent the updated one with phase continuity, that is, $$P_1 e^{j\varphi_1}.$$

The procedure described, (where $\varphi_1 = -\text{phase}(P_0^H P_1)$, $\varphi_2 = -\text{phase}(T_1^H P_2)$, and $T_1$ may represent the updated one with phase continuity, that is, $$P_1 e^{j\varphi_1}),$$

repeats until the end of the tone of each OFDM symbol. The Phase Continuity Process for each Precoder of a participating AP may be performed separately. Accordingly, each participating AP may perform its own Phase Continuity Process during beamforming.

Embodiments described herein may provide for a procedure for AP-AP share transmission involving collaborating APs. Embodiments described herein may further provide for a format for an AP-AP share frame.

Figure 6:
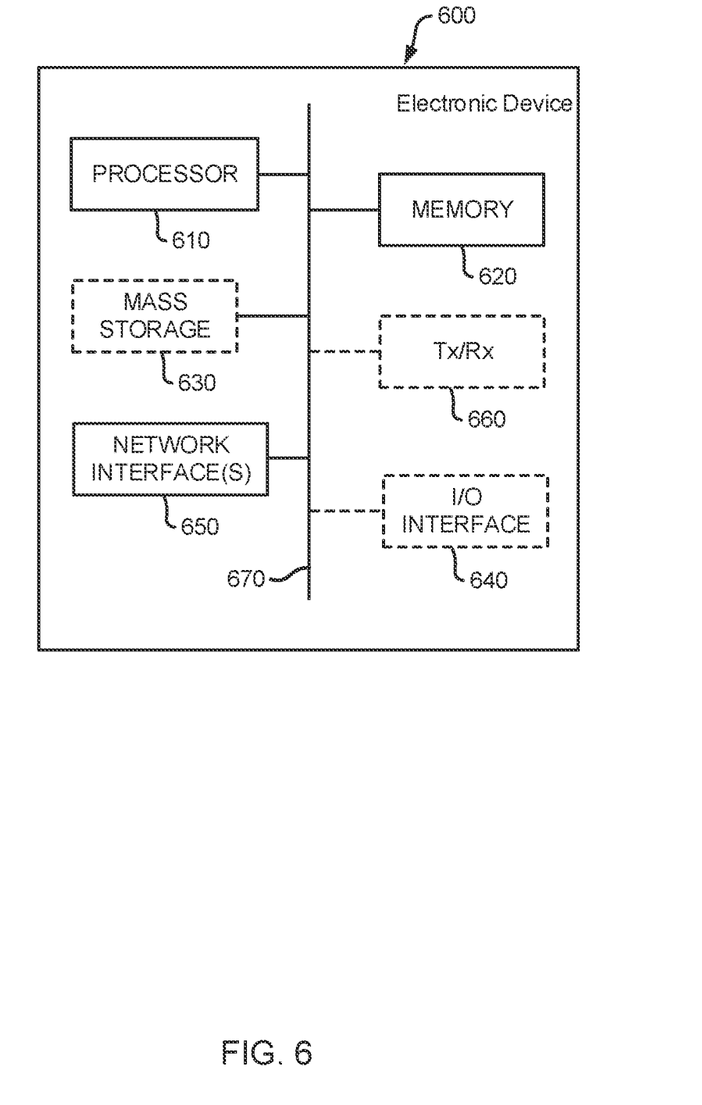
FIG. 6 is a schematic diagram of an electronic device that may perform any or all of operations of the above methods and features explicitly or implicitly described herein, according to different embodiments of the present invention.

FIG. 6 is a schematic diagram of an electronic device 600 that may perform any or all of operations of the above methods and features explicitly or implicitly described herein, according to different embodiments of the present invention. For example, a computer equipped with network function may be configured as electronic device 600. In some embodiments, the electronic device 600 may be a UE, an AP, a STA, or the like as appreciated by a person skilled in the art.

As shown, the electronic device 600 may include a processor 610, such as a Central Processing Unit (CPU) or specialized processors such as a Graphics Processing Unit (GPU) or other such processor unit, memory 620, non-transitory mass storage 630, input-output interface 640, network interface 650, and a transceiver 660, all of which are communicatively coupled via bi-directional bus 670. According to certain embodiments, any or all of the depicted elements may be utilized, or only a subset of the elements. Further, electronic device 600 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 620 may include any type of non-transitory memory such as static random access memory (SRAM), dynamic random access memory (DRAM), synchronous DRAM (SDRAM), read-only memory (ROM), any combination of such, or the like. The mass storage element 630 may include any type of non-transitory storage device, such as a solid state drive, hard disk drive, a magnetic disk drive, an optical disk drive, USB drive, or any computer program product configured to store data and machine executable program code. According to certain embodiments, the memory 620 or mass storage 630 may have recorded thereon statements and instructions executable by the processor 610 for performing any of the aforementioned method operations described above.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disc read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include a number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising:
sending, by a first access point (AP) of a plurality of collaborating APs to one or more stations (STAs) associated with the plurality of collaborating APs, a request for channel state information (CSI) associated with the one or more STAs and the first AP;
receiving, by the first AP of the plurality of collaborating APs, from the one or more STAs, a response comprising the CSI associated with the one or more STAs and the first AP;
sending, by the first AP of the plurality of collaborating APs, to a second AP of the plurality of collaborating APs, a sounding request indicating to the second AP to request, from the one or more STAs, CSI associated with the one or more STAs and the second AP of the plurality of collaborating APs;
receiving, by the first AP of the plurality of collaborating APs, from the second AP of the plurality of collaborating APs, a first AP-AP share message including the CSI associated with the one or more STAs and the second AP of the plurality of collaborating APs; and
sending, by the first AP to the second AP, a second AP-AP share message including the CSI associated with the one or more STAs and the first AP, wherein:
the second AP-AP share message comprises a frame including:
a selected user field indicating the CSI associated with the one or more STAs and the first AP; and
one or more fields indicating one or more of: an identifier of the first AP; an indication that the frame is an AP-AP share frame; one or more STAs associated with the first AP; one or more streams per STA of the one or more STAs associated with the first AP; and precoder information associated with the second AP.

2. The method of claim 1 further comprising: computing, by the first AP, a plurality of precoders, wherein each computed precoder:
corresponds to a respective AP of the plurality of collaborating APs; and
is based on CSI information associated with the one or more STAs and the respective AP.

3. The method of claim 2, wherein the precoder information indicates a computed precoder of the plurality of precoders.

4. The method of claim 1, wherein the precoder information indicates a precoder index indicating a precoder computation method.

5. The method of claim 1, wherein the identifier of the first AP is indicated in a transmitter address (TA) field of a medium access control (MAC) header of the frame.

6. A method comprising:
receiving, by a first access point (AP) from a second AP, a first share message including channel state information (CSI) associated with the second AP, wherein the first AP and the second AP are in collaboration; and
sending, by the first AP to the second AP, a second share message comprising a frame including one or more fields indicating one or more of:
a selected user field indicating the CSI associated with the first AP; and
one or more fields indicating one or more of: an identifier of the first AP; an indication that the frame is an AP-AP share frame; one or more stations (STAs) associated with the first AP; one or more streams per STA of the one or more STAs associated with the first AP; and precoder information associated with the second AP.

7. The method of claim 6 further comprising:
computing, by the first AP, a precoder associated with the second AP based on the CSI associated with the second AP.

8. The method of claim 7, wherein the precoder information associated with the second AP indicates the computed precoder associated with the second AP.

9. The method of claim 7, wherein the precoder information associated with the second AP indicates a precoder index indicating a precoder computation method.

10. The method of claim 7, wherein the identifier of the first AP is indicated in a transmitter address (TA) field of a medium access control (MAC) header of the frame.

11. An apparatus comprising:
at least one processor and at least one machine-readable medium storing executable instructions which when executed by the at least one processor configure a first access point (AP) of a plurality of collaborating APs for:
sending to one or more stations (STAs) associated with the plurality of collaborating APs, a request for channel state information (CSI) associated with the one or more STAs and the first AP;
receiving, from the one or more STAs, a response comprising the CSI associated with the one or more STAs and the first AP;
sending, to a second AP of the plurality of collaborating APs, a sounding request indicating the second AP to request CSI associated with the one or more STAs and the second AP from the one or more STAs;
receiving, from the second AP, a first AP-AP share message including the CSI associated with the one or more STAs and the second AP; and
sending, to the second AP, a second AP-AP share message including the CSI associated with the one or more STAs and the first AP, wherein:
the second AP-AP share message comprises a frame including:
a selected user field indicating the CSI associated with the one or more STAs and the first AP; and
one or more fields indicating one or more of: an identifier of the first AP; an indication that the frame is an AP-AP share frame; one or more STAs associated with the first AP; one or more streams per STA of the one or more STAs associated with the first AP; and precoder information associated with the second AP.

12. The apparatus of claim 11, wherein the executable instructions which when executed by the at least one processor further configure the first AP for:
computing a plurality of precoders, wherein each computed precoder:
corresponds to a respective AP of the plurality of collaborating APs; and
is based on CSI information associated with the one or more STAs and the respective AP.

13. The apparatus of claim 12, wherein the precoder information indicates a computed precoder of the plurality of precoders.

14. The apparatus of claim 11, wherein the precoder information indicates a precoder index indicating a precoder computation method.

15. The apparatus of claim 11, wherein the identifier of the first AP is indicated in a transmitter address (TA) field of a medium access control (MAC) header of the frame.

* * * * *